ably connected therewith an inclined
UNITED STATES PATENT OFFICE.

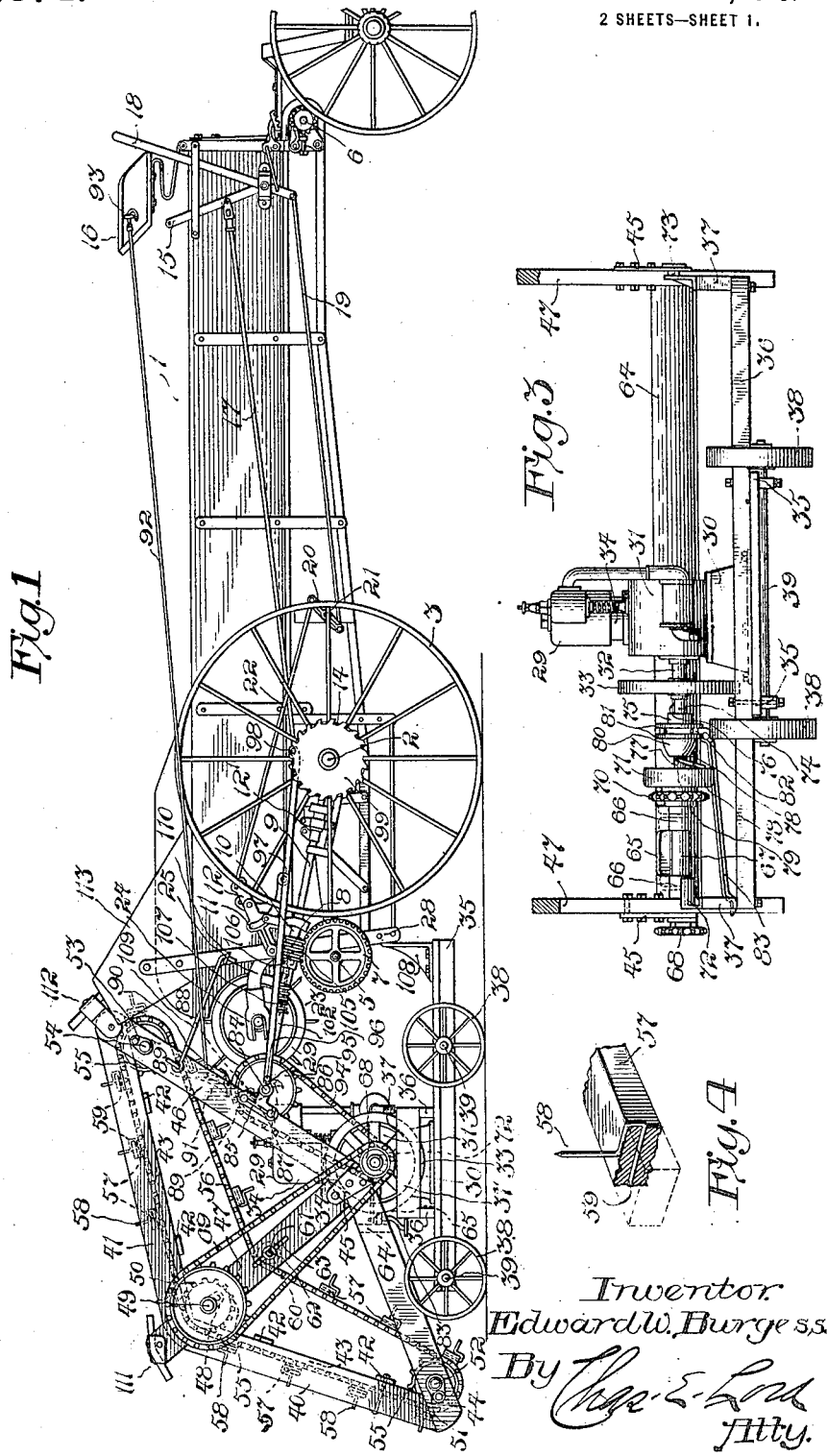

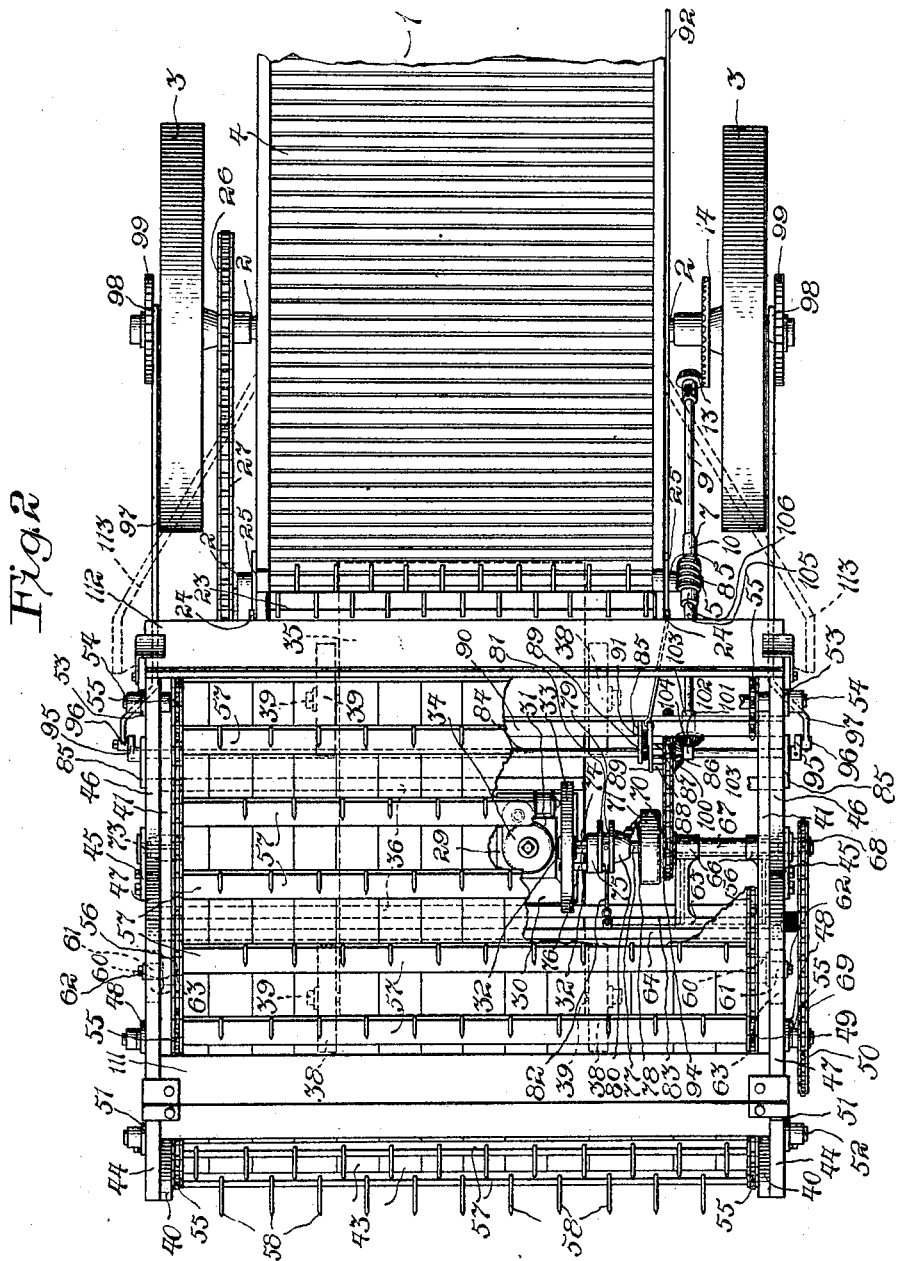

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

MANURE-LOADER.

1,323,674.    Specification of Letters Patent.    Patented Dec. 2, 1919.

Application filed February 3, 1916. Serial No. 76,044.

*To all whom it may concern:*

Be it known that I, EDWARD W. BURGESS, a citizen of the United States, residing at Chicago, in the county of Cook and State of Illinois, have invented certain new and useful Improvements in Manure-Loaders, of which the following is a full, clear, and exact specification.

My invention relates to manure loaders adapted to elevate and deliver the manure from the yard to the receptacle of a standard manure spreader, and includes an engine mounted upon a wheeled truck having detachably connected therewith an inclined elevator frame having an endless carrier mounted thereon and operatively connected with the engine shaft, means for connecting the loader with the rear end of the spreader, means carried by the loader and operatively connected with the carrying wheels of the spreader and controlled by the operator whereby the spreader and loader may be moved toward a pile of manure or around a yard in a manner to operate more or less aggressively, depending upon the power of the engine, and means carried by the loader and operatively connected with the movable bottom of the spreader receptacle in a manner to move it in a reverse direction at the will of the operator for the purpose of carrying the load toward the front end of the receptacle as the loader delivers the material into its rear end.

The object of the invention is to provide a power driven mechanism controlled by the operator that will quickly load the manure spreader and provide means whereby the loading mechanism may be quickly coupled with or uncoupled from the spreader, and also to be readily detachable from the engine and its truck when it is desired to use the engine for other purposes.

This object is attained by means of the mechanism illustrated in the accompanying drawings, in which—

Figure 1 is a side elevation of part of a common form of manure spreader having an embodiment of my invention connected therewith;

Fig. 2 is a top plan view of the loader and the rear end of the spreader;

Fig. 3 is a front elevation of an internal combustion engine mounted upon a truck and illustrating the manner of mounting the frame of the loader thereon and connecting its operative parts with the engine shaft; and Fig. 4 is a detail part of the endless carrier mechanism of the loader on an enlarged scale.

Referring to the drawings, wherein the same reference characters designate like parts throughout the several views, the manure spreader is one having a common form, and includes a receptacle 1, a rotatable axle 2 having carrying and traction wheels 3 mounted upon its opposite ends, 4 the movable bottom of the receptacle driven by means including a transversely disposed shaft 5 journaled in bearings carried by the rear end walls of the receptacle and operatively connected with an idler shaft 6 journaled in bearings carried by the front end of the receptacle, 7 a worm wheel secured to one end of the shaft 5 and adapted to engage with a driving worm 8 secured to the rear end of a shaft 9 journaled in a bearing 10 carried by an adjustable bracket 11 that is operatively connected with a lever arm 12 pivoted upon the side of the receptacle. The front end of the shaft 9 is journaled in a bearing 12$^1$ turnable about the axis of the axle in a manner permitting the rear end of the shaft to be raised or lowered to disengage or cause engagement of the worm from or with the worm wheel, and slidable thereon is a pinion 13 that may selectively engage with either of a series of concentrically disposed lines of teeth upon a gear wheel 14 rotatable with the axle, or it may be moved to a neutral position between the lines of teeth. Means for adjusting the pinion upon the shaft include a hand lever 15 pivotally mounted upon one side of the receptacle at its front end convenient to the hand of the operator upon the seat 16 and connected, by means of a rod 17, with the pinion. Means are provided for raising the rear end of the shaft 9 including a hand lever 18, preferably pivoted coaxially with the lever 15, and having its lower end connected, by means of a rod 19, with one end of a double armed lever 20 secured to one end of a transversely disposed rock shaft 21 journaled in bearings carried by the body of the receptacle, the remaining arm of the lever being connected, by means of a rod 22, with the free end of the arm 12.

23 represents a distributing cylinder journaled in bearings 24 carried by rearwardly extending forked arms 25 secured to opposite sides of the rear end of the receptacle. The cylinder is driven by means including a sprocket wheel 26 operatively connected with the axle and having a chain connection 27 with the cylinder.

The frame of the spreader includes vertically disposed bars 28 upon opposite sides of the rear end of the receptacle and extending below the operative plane of the worm wheel 7.

29 represents an internal combustion engine including a base 30, a crank case 31, in which is journaled an engine shaft 32, having a fly wheel 33 secured thereto, and 34 a vertically disposed power cylinder carried by the crank case. The engine is mounted upon a truck frame including longitudinally disposed frame members 35 and transversely disposed members 36, and having secured to their opposite ends frame members 37, and 38 carrying wheels journaled upon opposite ends of supporting axles 39.

The loader includes an elevator frame comprising upwardly and forwardly inclined members 40 disposed upon opposite sides of the machine, having their upper ends connected with the rear ends of side frame members 41 that are inclined upward and forward to a plane above that of the distributing cylinder of the spreader, and 42 represents transversely disposed frame members having their opposite ends secured to the lower edges of the side frame members, and to which are secured deck boards 43. Secured to the lower ends of the members 40 are the rear ends of frame members 44 that are inclined forward and upward and have their opposite ends secured to joint plate members 45 that connect them with the lower ends of upwardly inclined members 46 having their opposite ends secured to the front ends of the frame members 41, and 47 represents diagonally disposed members having their upper ends secured to the meeting ends of the members 40 and 41 and extended beyond them, and their opposite ends to the plate members 45 journaled in bearings 48 secured to the upper ends of the frame members 47 on shaft 49, having a driving sprocket 50 secured to one end outside of the frame. Secured to the rear ends of the frame members 44 are bearing boxes 51, in which is journaled a transversely disposed shaft 52. To the upper ends of the members 46 are secured like bearing boxes 53, having a transversely disposed shaft 54 journaled therein. Secured to opposite ends of the shafts 49, 52 and 54, inside the frame members 40 and 41, are sprocket wheels 55, over which run endless carrier chains 56 that are connected by means of cross bars 57, each carrying a series of spaced teeth 58, as shown in Fig. 4, and each having a shank portion 59 that is driven into the bar and its body turned upward and over the upper side of the bar and then outward to a desired distance required to engage the manure in a more or less aggressive manner, the form of the teeth being such as will, when under heavy duty, permit them to yield backward without danger of loosening the shank from the bar.

60 represents idler wheels supporting the lower leads of the gear chains and journaled upon studs 61 that are secured to the frame members 47 by means of bolts 62 received by slotted openings 63, whereby the idlers may be adjusted in a manner to regulate the tension of the endless carrier.

64 represents a transversely disposed frame member having its opposite ends secured to the side frame members 44, 65 a bracket secured to the frame member 64 and having bearing boxes 66 integral therewith, and in which is journaled a sleeve 67 having secured to its outside end a sprocket wheel 68 that is operatively connected, by means of a chain 69, with the sprocket wheel 50, and at its opposite end a combined sprocket wheel 70 and clutch member 71.

Secured to one of the truck frame members 37 is a bracket member 72, having its upper end provided with a notch that receives the outside bearing box 66 in which the sleeve 67 is journaled, and to the other frame member 37 is secured a similar bracket having a trunnion 73 in axial alinement with the sleeve 67 and adapted to be received by a notch in the joint plate 45 at the opposite side of the machine whereby the loader is detachably connected with the truck carrying the engine.

74 represents a driving shaft adapted to connect the operative parts of the loader with the engine shaft, having one end journaled in the sleeve 67 and its opposite end provided with an adjustable coupling member 75 carrying an arm 76 that is received between two of the spokes of the fly wheel of the engine.

The clutch mechanism that operatively connects the driving shaft 74 with the sleeve 67 is preferably of the split ring type, as illustrated and described in Patent No.

947,351, issued January 25, 1910, to C. A. A. Rand, and includes the clutch member 71, a split ring member (not shown) carried by a hub 77 secured to the shaft and provided with an actuating arm 78 carrying at its free end an adjustable set screw 79 that engages with a conical clutch controlling member 80 splined to the shaft 74 and having spaced flanges 81 that receive between them a clutch shipping fork 82 that is controlled by means of a laterally extending foot lever 83 pivoted upon the cross frame member 64.

84 represents a transversely disposed shaft journaled in bearings 85 secured to the middle part of the side frame members 46, and journaled upon the shaft is a sprocket wheel 86 having clutch teeth 87 upon its hub that are adapted to engage with a spring-pressed pawl 88 pivotally mounted upon an arm 89 secured to the shaft and controlled in a common way by means of a clutch tripping arm $89^1$ pivotally mounted upon a cross bar 90 secured to the frame members 47, and 91 represents a tension spring operatively connected with the arm and to a fixed part of the frame structure in a manner to normally swing the arm to a position to engage with the part 88 and hold it disengaged from the clutch teeth 87.

The clutch tripping arm is controlled by the operator from the seat on the spreader by means of a line 92, having one end connected with the arm and its opposite end releasably connected with a hook 93 carried by an end wall of the seat.

The sprocket wheel 86 is operatively connected with the sprocket wheel 70 by means of a chain 94, and is thereby rotated continuously when the machine is in operation.

Secured to opposite ends of the shaft 84 are crank arms 95, having crank pins 96 that are received by the rear ends of reciprocatory pitmen 97, provided at their front ends with laterally turned ends 98 adapted to engage with toothed ratchet wheels 99 secured to the hubs of the traction wheels of the spreader, the bodies of the pitmen being disposed between the rims of the wheels and the inner faces of the ratchet wheels in a manner to retain the parts in operative relation. Integral with the sprocket wheel 86 is a bevel pinion 100 meshing with a corresponding pinion 101 secured to the rear end of a shaft 102 journaled in a bearing 103 forming part of an arm 104 turnable about the axis of the shaft 84. The opposite end of the shaft 102 carries a universal coupling member 105 that is splined to the shaft and adapted to engage with a complemental coupling member 106 secured to the rear end of the shaft 9 that actuates the movable bottom of the spreader, and 107 represents a compression spring encircling the shaft 102 and operative to normally hold the two coupling members in engagement. 108 represents bumper brackets secured to the front ends of the truck frame members 35 and adapted to contact with a fixed part of the spreader structure, as with the lower ends of the vertically disposed bars 28, in a manner to properly position the loader relative to the spreader when they are operatively connected, and 109 represents hooked rods carried by the frame members 47 and engaging with eye members 110 carried by the spreader in a manner to secure the loader in an operative position.

The loader has a width equal to that of the tread of the traction wheels of the spreader, and the receiving end of the endless elevator carrier follows the surface of the yard in moving through or around a pile of manure. 111 represents a deflector hood carried by the extensions of the diagonal frame members 47, and 112 an adjustable deflector carried by the delivery end of the elevator. 113 represents inwardly converging wings that may form a part of the side walls of the spreader receptacle and operate to direct a stream of manure into the relatively narrow receptacle.

In operation the spreader is backed toward the loader, carrying its rear end against the bumper brackets 108; the operator then connects the hooked rods 109 with the eye members 110, places the universal coupling members 105 and 106 in engagement, swings the pitmen 97 downward into engagement with the ratchet wheels 99, and carries the free end of the clutch tripping line 92 forward to the operator's seat upon the spreader. The engine is then started and the clutch mechanism connecting it with the sleeve 67 is thrown into engagement. The operator then pulls upon the clutch tripping line and disengages the arm $89^1$ from the pulley 98, permitting it to engage with the clutch teeth 87 upon the hub of the sprocket wheel 86 in a manner to cause the shaft 84 to rotate with the sprocket wheel and, through its crank shaft connections, impart a reciprocatory movement to the pitmen 97 and a step by step rotation of the traction wheels rearward to move the loader and spreader toward the pile, or to turn around the yard as the team is turned toward the right or left, and when the line is released a backward movement of the two machines is resisted. The shaft 9, when driven from the shaft 84 of the loader, is rotated in a reverse direction from that imparted to the traction wheels of the spreader and with the pinion 13 in a neutral position relative to the lines of teeth upon the gear wheel 14. If the worm 8 is caused to engage with the worm wheel 7 by the operator manipulating the hand lever 15, the movable bottom of the spreader receptacle will be moved upward, carrying the load toward the free end thereof as the rear end is being filled by the operation of the loader mechanism. The operator controls an aggressive action of the loader within the power developed by the engine by means of the clutch tripping line and the action of the movable bottom by means of a lever 15.

Having shown and described an embodiment of my invention, and the manner of connecting it with one type of manure spreader, I do not desire that it be limited to the precise details of the structure as illustrated, it being understood that changes may be made in the form, proportion and organization of its various parts, and in adapting it for use in connection with other forms of spreaders or for other purposes or uses as desired without departing from the spirit of the invention as indicated in the appended claims.

What I claim as my invention, and desire to secure by Letters Patent, is:

1. A power operated manure loader in combination with a vehicle, said vehicle including a receptacle, a movable load carrying element operative along the bottom of said receptacle, and means forming part of the vehicle mechanism for actuating said load carrying element in one direction, said loader including a source of power and independently controlled means operatively connected to said source of power for elevating and conveying material into said receptacle, and means actuated by said source of power and connected with said load carrying element for moving it in an opposite direction.

2. A power operated manure loader in combination with a vehicle, said vehicle including a receptacle, a load carrying element operative along the bottom of said receptacle, traction wheels upon which said receptacle is mounted, operative connections between said wheels and load carrying element, said loader including a source of power and means operatively connected to said source of power for elevating and delivering material into said receptacle, and independently controlled means actuated by said source of power and operative to move said load carrying element away from said loader.

3. In combination, a vehicle including a receptacle, carrying wheels having said receptacle mounted thereon, a ratchet wheel secured to one of said carrying wheels, a manure loader, and means whereby it may be detachably connected with said vehicle, said loader including a power driven material elevating and carrying element operative to deliver manure into said receptacle, and a pitman connecting said power driven element with said ratchet wheel whereby said loader and vehicle may be moved bodily.

4. In combination, a vehicle including a receptacle, carrying wheels having said receptacle mounted thereon, ratchet wheels secured to said carrying wheels, a manure loader including an elevator frame having an endless carrier mounted thereon, a power driven shaft operatively connected with said carrier, a transversely disposed shaft journaled upon said frame and operatively connected with said power driven shaft by means including manually controlled clutch mechanism, crank arms secured to opposite ends of said shaft, and pitmen operatively connecting said crank arms with said ratchet wheels.

5. In combination, a vehicle including a receptacle, carrying and traction wheels having said receptacle mounted thereon, a movable load carrying element operative to advance material toward the rear, means for moving said carrying element including a rotatable shaft journaled on the receptacle and having a gear member secured to one end thereof, operative connections between said traction wheels and said gear member for rotating said shaft in one direction to advance material toward the rear, a manure loader detachably connected with said vehicle and including power driven material elevating mechanism operative to deliver material to said receptacle, and operative connections between said mechanism and the operative connections between said gear member and said traction wheels whereby said load carrying element is moved in an opposite direction.

6. A power operated manure loader including a source of power in combination with a vehicle, said vehicle including a receptacle, a load carrying element operative on the bottom of said receptacle, traction wheels upon which said vehicle is mounted, operative connections between said traction wheels and said load carrying element, means for controlling said operative connections, operative connections between said source of power and said load carrying element, means for controlling said last-named operative connections, said loader including means for elevating and delivering material into said vehicle, operative connections between said source of power and said elevating and delivering means, and independent controlling means for said last named operative connections.

7. A power operated manure loader, including a source of power in combination with a vehicle, said vehicle including a receptacle, a load carrying element operative along the bottom of said receptacle, traction wheels upon which said receptacle is mounted, operative connections between said wheels and said load carrying element, means for controlling said operative connections, operative connections between said source of power and said load carrying element on said vehicle, means for controlling said last named operative connections, means on said loader for elevating and delivering material into said receptacle, operatively connected to said source of power, independent controlling means for said last-named operative connections, and operative connections between said traction wheels and said source of power for rotating said traction wheels step by step in a rearward direction.

In testimony whereof I affix my signature.

EDWARD W. BURGESS.